United States Patent [19]

Russell

[11] Patent Number: 4,581,690
[45] Date of Patent: Apr. 8, 1986

[54] SWITCHED-MODE POWER SUPPLY WITH OUTPUT POST-REGULATOR

[75] Inventor: Randy G. Russell, Northbrook, Ill.

[73] Assignee: Zenith Corporation, Glenview, Ill.

[21] Appl. No.: 589,965

[22] Filed: Mar. 15, 1984

[51] Int. Cl.⁴ ............................................. H02M 3/337
[52] U.S. Cl. ........................................ 363/17; 363/26; 363/80; 363/90; 363/101
[58] Field of Search ............... 363/17, 25, 26, 70, 363/80, 90, 101; 323/267, 263

[56] References Cited

U.S. PATENT DOCUMENTS

| | | | |
|---|---|---|---|
| 4,253,137 | 2/1981 | Rao | 363/21 |
| 4,301,497 | 11/1981 | Johari | 363/21 |
| 4,318,039 | 3/1982 | Abbott | 323/273 |
| 4,327,404 | 4/1982 | Horiguchi | 363/19 |
| 4,419,723 | 12/1983 | Wilson | 363/90 |

FOREIGN PATENT DOCUMENTS

| | | | |
|---|---|---|---|
| 99922 | 8/1979 | Japan | 363/17 |
| 140154 | 10/1979 | Japan | 363/17 |
| 1049874 | 10/1983 | U.S.S.R. | 363/90 |

OTHER PUBLICATIONS

Contino et al., "Flyback Switching Power Supplies with Individual Output Regulation," IBM Tech. Discl. Bul., vol. 22, No. 2, pp. 632,633, Jul. 1979.
Moormau, "Buck/Boost Add-On Switch Regulator," IBM Tech. Discl. Bul., vol. 22, No. 7, pp. 2801-2802, Dec. 1979.

Primary Examiner—William H. Beha, Jr.

[57] ABSTRACT

A switched-mode power supply provides a plurality of directly regulated DC output voltages. The power supply includes a first inverter-coupled transformer for providing first and second DC output voltages, with a feedback loop provided from a first output to the inverter for regulating the first DC output voltage. A second transformer is coupled across the first and second output lines of the first transformer and is further coupled across the second output lines by means of a switching regulator circuit including a second feedback loop for regulating the second DC output voltage. By proper selection of the number of turns of the second transformer, the regulator is capable of either substantially increasing the second output voltage when the switching device is on while lowering the output voltage very little when the switching device is off, or increasing the second output voltage very little with the switching device on while substantially lowering the output voltage when the switching device is off. This permits the use of a large turns ratio in the second transformer in combination with smaller diodes and transistors which carry current equal to the output current divided by the second transformer's turns ratio. Reduced output current provides more efficient power supply operation, while the use of smaller semiconductors reduces power supply cost.

20 Claims, 5 Drawing Figures

FOR $V_2 > V_1$

FOR $V_2 < V_{NORM}$

SWITCHED-MODE POWER SUPPLY WITH OUTPUT POST-REGULATOR

BACKGROUND OF THE INVENTION

This invention relates generally to a power supply circuit for providing a DC output voltage and is particularly directed to an improved switched-mode power supply for generating plurality of regulated DC output voltages.

In general, a switched-mode power supply includes a switch, an inductor, a rectifier, a capacitor and a load. The load may be considered a resistance in parallel with the capacitor. During that portion of the period in which the switch conducts, a ourrent originating from the input voltage source passes through the inductor resulting in the storage of energy therein. During the other part of the period, in which the switch is rendered nonconducting, the energy stored in the inductor produces a current through the rectifier which recharges the capacitor and replenishes the energy losses due to the load. By controlling the conducting period of the switch relative to this cycle, the output DC voltage across the load can be rendered independent of variations of the input DC voltage which may arise from a variety of factors, including fluctuations in the AC line supply. It is well known in the prior art to employ pulse width modulation (PWM) responsive to an error signal derived from the output voltage to provide a closed regulation loop for maintaining a constant output voltage despite input and/or load variations.

In many systems energized by a DC power supply, it is necessary to provide various regulated DC output voltages to different components in the system. For example, a plurality of precisely defined voltage levels may be required for biasing semiconductor components or for driving logic and/or memory circuitry in a data processing system application. Most prior art switched-mode power supplies offer only one regulated DC output voltage, while the other outputs are semi-regulated by the coupling of the inverter transformer. This provides one well regulated output and other outputs which can vary greatly under various load conditions. If a high level of regulation is required on more than one output, the prior art approach has generally involved either the utilization of exotic and expensive regulator networks for providing multiple regulated outputs, the use of separate regulator networks for each different biasing voltage, or providing a higher input voltage on the inverter transformer in combination with a linear regulator to drop the voltage down to the required level. The first two approaches are complicated and expensive, while the latter approach results in a reduction of power supply efficiency and requires the use of large transistors and heat sinks in higher current applications which also results in a more expensive power supply.

U.S. Pat. No. 4,318,039 to Abbott discloses a DC power supply requiring a complicated and expensive linear regulator circuit requiring as many as 20 semiconductor devices for regulating only one output voltage, with no regulation provided for a second output. U.S. Pat. Nos. 4,253,137 to Rao and 4,327,404 to Horiguchi disclose switched-mode power supply circuits providing only a single DC output voltage. U.S. Pat. No. 4,301,497 to Johari discloses a flyback type DC converter employing a feedback loop to correct for load variations and a forward feed circuit to correct for line voltage variations. The aforementioned patents provide only a single regulated DC output voltage and require complicated and expensive voltage regulation circuitry.

The present invention is intended to overcome the aforementioned limitations of the prior art by providing a switched-mode power supply with output post-regulation capable of operating at reduced output currents and hence increased operating efficiencies while providing a plurality of well regulated DC output voltages.

OBJECTS OF THE INVENTION

Accordingly, it is an object of the present invention to provide a highly efficient, relatively inexpensive DC power supply.

It is another object of the present invention to provide a switched-mode power supply capable of providing a plurality of well regulated DC output voltages without the use of expensive semiconductors.

Yet another object of the present invention is to provide improved output voltage regulation in a switched-mode power supply.

A further object of the present invention is to provide a DC power supply capable of selectively increasing or decreasing the output voltage depending upon load conditions while providing a high level of output voltage regulation.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings where like reference characters identify like elements throughout the various figures, in which:

DESCRIPTION OF THE PREFERRED EMBODIMENT

Figure 1:
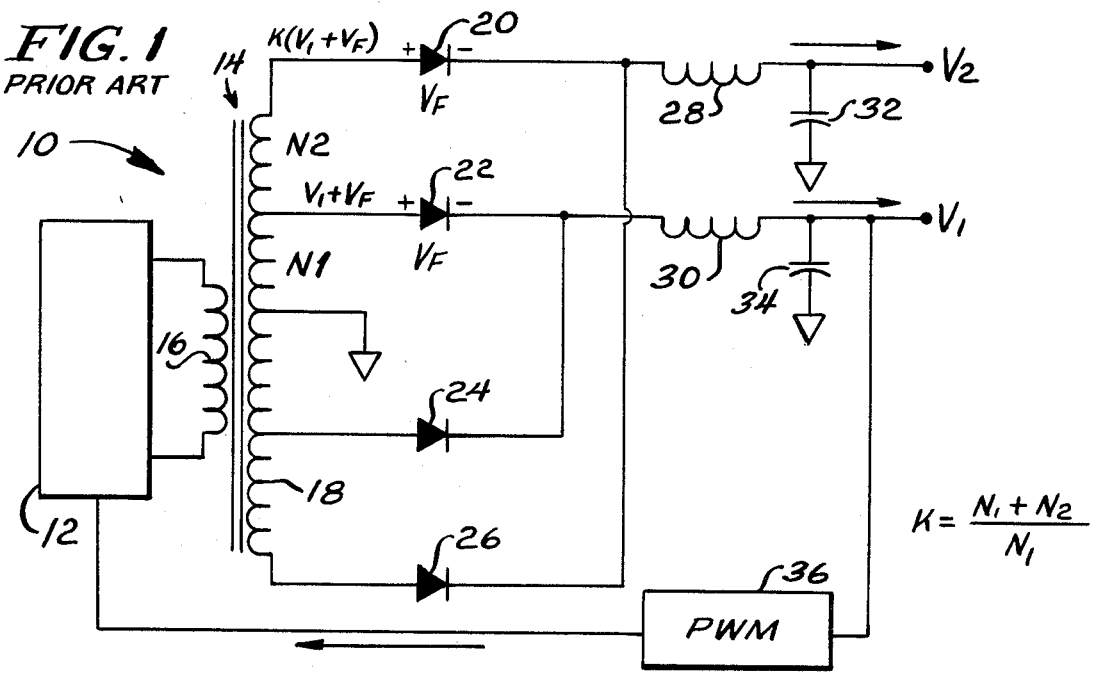
FIG. 1 is a combination schematic and block diagram of a conventional prior art switched-mode power supply.

Referring to FIG. 1, there is shown in simplified block and schematic diagram form a prior art switched-mode power supply 10. The switched-mode power supply 10 includes an inverter stage 12 typically comprised of a conventional switching device such as a push-pull amplifier, a half bridge, or a full bridge for converting a direct current into an alternating current. The alternating current is provided by the inverter stage 12 to the primary winding 16 of an inverter transformer 14. The inverter transformer 14 includes a secondary winding 18 electromagnetically coupled to the primary winding 16 thereof and from which first and second output voltages $V_1$, $V_2$ are derived. The first output voltage $V_1$ is derived from N1 turns of secondary winding 18, while the second output voltage $V_2$ is derived from N2 turns of secondary winding 18 of the inverter transformer 14. Alternating phases of $V_1$ are provided sequentially via rectifying diodes 22, 24, while alternating phases of $V_2$ are transmitted via rectifying diodes 20, 26 to the respective output lines. With $N2 > N1$, $V_2$ is greater than $V_1$. The $V_1$ and $V_2$ output voltages are respectively filtered by means of the combination of inductor 30 and grounded capacitor 34 and inductor 28 and grounded capacitor 32.

An output voltage regulation loop is provided by means of a regulator 36 coupling the $V_1$ output line with the inverter stage 12. This arrangement is typical of prior art multiple output switched-mode power supplies where the regulation loop is typically closed around one output, with the other output semi-regulated by the coupling of the inverter transformer 14. Regulator 36 typically includes a pulse width modulator (PWM) in the feedback control loop. This arrangement provides one well regulated output, with the other output voltages subject to large variation under various load conditions. If tight regulation is required on more than one output, the prior art switched-mode power supply typically provides a higher voltage on the inverter transformer and makes use of a linear regulator (not shown) to drop the voltage down to the required level. The increased current and voltage involved with this approach reduces the efficiency of the power supply and requires the use of large transistors and heat sinks in higher current applications, thus increasing the cost of the power supply. U.S. Pat. No. 4,318,039, noted above, is an example of this type of power supply which utilizes an overly complicated linear regulator circuit.

With respect to the prior art switched-mode power supply shown in FIG. 1, the unregulated output $V_2$ may be expressed in terms of the regulated output $V_1$ by the following expression:

$$V_2 \delta V_{NORM} \delta K(V_1 + V_F) - V_F \quad (1)$$

With the regulated output $V_1$ held constant, the unregulated output $V_2$ varies due to the different voltage drops across the various diodes ($V_F$) at different current levels and the parasitic resistances and inductances of the circuit. Therefore, the approximately equals sign is utilized in equation (1). In equation (1), $V_{NORM}$ represents the normal output voltage of a switched-mode supply, while K is the ratio of $N_1 + N_2/N_1$.

Figure 2:
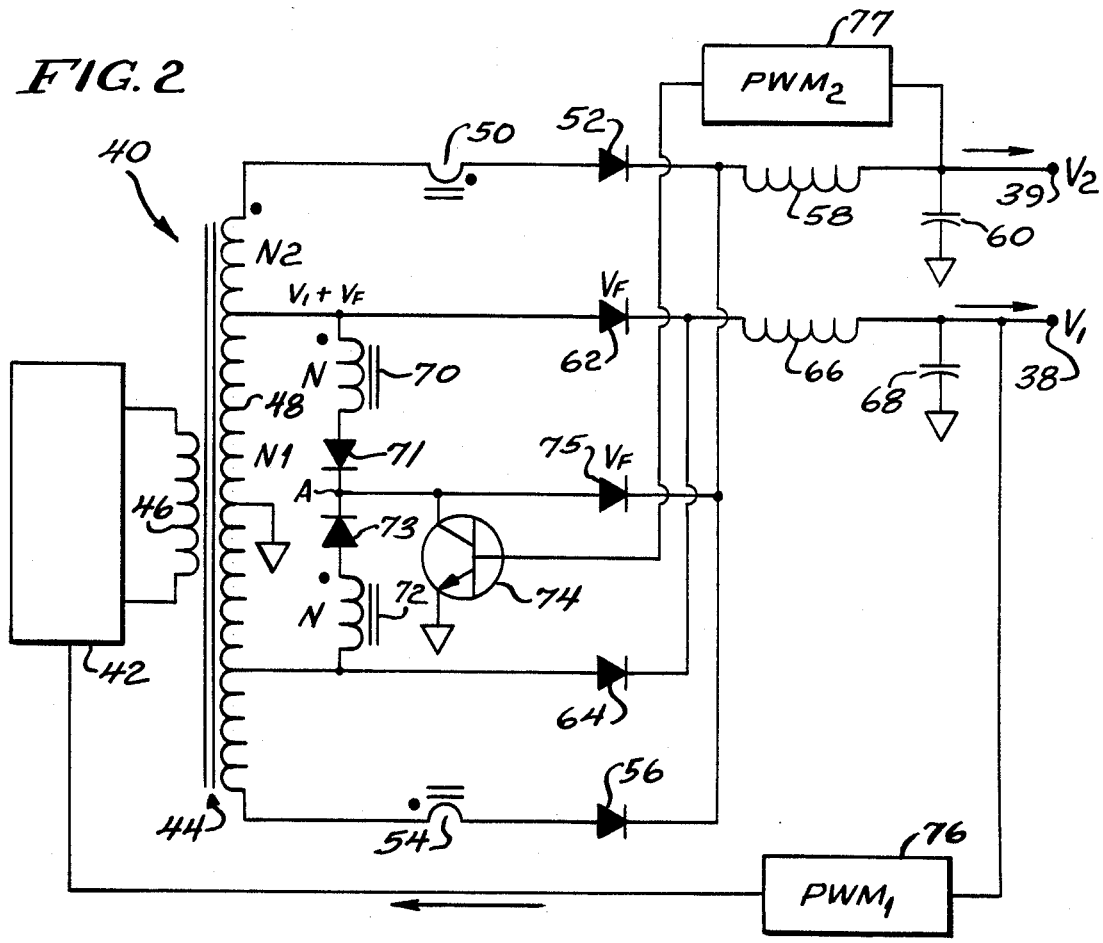
FIG. 2 shows in combined schematic and block diagram form a switched-mode power supply with output post regulation in accordance with the present invention.

Referring to FIG. 2, there is shown in combined schematic and block diagram form a switched-mode power supply 40 in accordance with the present invention. The switched-mode power supply 40 includes an inverter stage 42 for converting a direct current into an alternating current and providing the alternating current to the primary winding 46 of an inverter transformer 44. The inverter transformer 44 includes a secondary winding 48, from the N1 and N2 turns thereof are derived $V_1$ and $V_2$ output voltages, respectively. The sense of the N1 and N2 secondary windings of transformer 44 are the same, with the $V_1$ and $V_2$ output voltages assuming positive voltage values in the embodiment described herein, although the present invention is not limited to this arrangement.

The $V_1$ output voltage derived from the N1 winding of inverter transformer 44 is provided to the $V_1$ output terminal 38 during alternating phases thereof via rectifying diodes 62, 64. Similarly, the $V_2$ output of switched-mode power supply 40 is provided to the $V_2$ output terminal 39 during alternating phases of the output signal via rectifying diodes 52, 56. The $V_1$ output voltage is regulated by means of a feedback loop to the inverter circuit 42, which feedback loop includes a regulating device such as a first pulse width modulator (PWM$_1$) 76. The first pulse width modulator 76 may be a comparator or an error amplifier for comparing the $V_1$ DC output voltage with a reference voltage and for generating and providing a correction signal to the inverter stage 42 for controlling the alternating drive inputs to the primary winding 46 of inverter transformer 44. It is in this manner that the first DC output voltage $V_1$ is directly regulated in providing a first level DC output from the switched-mode power supply 40. The first output voltage $V_1$ is filtered by means of the combination of inductor 66 and grounded capacitor 68. Similarly, the $V_2$ output is filtered by means of the combination of inductor 58 and grounded capacitor 60.

The present invention includes a second transformer having a plurality of windings 50, 70, 72 and 54 which are coupled to the secondary winding 48 of the inverter transformer 44 for receiving the alternating output therefrom. There are basically two modes of operation in the switched-mode power supply 40: either NPN transistor 74 is on or off for regulating the output voltage $V_2$, with the manner in which this regulation is accomplished described in the following paragraphs.

TRANSISTOR 74 IS ON

With transistor 74 conducting, current flows during one-half cycle through winding 70 of the second transformer and diode 71 to NPN transistor 74 and thence to ground. Back-biased diode 73 prevents current from flowing through winding 72 of the second transformer. Similarly, during the following one-half cycle in which current flows through diode 64, current will flow through winding 72 and diode 73 to NPN transistor 74 and thence to ground. Diode 71 blocks current from flowing through winding 70 of the second transformer during this one-half cycle. Current will flow either through NPN transistor 74 to ground or via diode 75 to the $V_2$ output line depending upon whether transistor 74 is rendered conductive by a control input provided from a second pulse width modulator (PWM$_2$) which forms a regulator feedback loop with respect to the $V_2$ output.

The second transformer coupled to the secondary winding 48 of inverter transformer 40 not only includes single turn windings 50, 54, but also multiple turn windings 70, 72 which are serially coupled in combination with diodes 71 and 73 across the N1 winding of secondary 48. Thus, a portion of the alternating current from winding $N_1$ which would otherwise be provided via diodes 62 and 64 to the output line of the first DC output voltage $V_1$ is provided through the serial combinations of winding 70, diode 71 and winding 72, diode 73 during alternating cycles of the AC output of inverter transformer 44. The junction of diodes 71 and 73 designated as point A in FIG. 2, is coupled by means of rectifying diode 75 to the output line of the second DC output voltage $V_2$. The ratio of the current flowing via windings 50 and 54 and that flowing through windings 70 and 72 of the second transformer to the output line of the seoond regulated DC output voltage $V_2$ is determined by the turns ratio of the respective pairs of windings. As shown in the figure, windings 50 and 54 are comprised of one turn, while windings 70 and 72 each include N turns. Therefore, less current flows through diode 75 to the output line of the $V_2$ DC output voltage than through diodes 52 and 56 as determined by the value N.

A second feedback loop comprised primarily of a second pulse width modulator (PWM$_2$) 77 is provided from the output line of the second DC output voltage $V_2$ to the base of NPN transistor 74. The collector of NPN transistor 74 is coupled to the anode of diode 75, while its emitter is coupled to neutral ground potential. The second pulse width modulator 77 provides a feedback signal representing the difference between the second DC output voltage $V_2$ and a predetermined voltage level. This feedback correction signal is provided from the second pulse width modulator 77 to the base of NPN transistor 74 for rendering the transistor conductive or nonconductive as determined by the value of $V_2$. It is in this manner that the switched mode power supply 40 of the present invention provides more than one directly regulated DC output voltage as described in the following paragraphs.

With transistor 74 rendered conductive by an input to its base from the second pulse width modulator 77, current transmitted through the respective combinations of winding 70, diode 71 and winding 72, diode 73 flows to ground. Therefore, with some of the $V_1$ output current directed to ground via transistor 74, there is an induced voltage across windings 50 and 54 at the second output of the switched-mode power supply 40 and the value of $V_2$ is thus increased by the voltage drop across windings 70 and 72. By thus selectively turning on transistor 74, the value of the second DC output voltage $V_2$ may be increased as desired. Because there are respectively more turns in windings 70 and 72 than in windings 50 and 54, less current flows through transistor 74 than through diode 52 and the output lines of the second DC output voltage $V_2$ and less current is therefore used for the regulation of this output. Thus, the current handling capabilities of the regulating transistor 74, as well as the various rectifying diodes, may be less than that required for a switching transistor in the output line of the second DC output voltage $V_2$ and the cost of the switched-mode power supply 40 is correspondingly reduced.

With current flowing alternately through windings 70 and 72 of the second transformer and through transistor 74 to ground, there is a 0.2VDC ($V_{CEsat}$) drop across the conducting transistor. The voltage across windings 50, 54, 70 and 72, is given by the expressions:

$$V_{ACROSS\ WINDINGS\ 70\ AND\ 72} = V_1 + V_F - V_F - V_{CEsat} \quad (2)$$
$$= V_1 + V_{CEsat} \quad (3)$$

$$V_{ACROSS\ WINDINGS\ 50\ AND\ 54} = \frac{V_1 - V_{CEsat}}{N} \quad (4)$$

where $V_F$ is the voltage drop across diodes 71 and 73.

Therefore, rewriting the expression for the second regulated DC output voltage $V_2$ in terms of the normal output voltage of a switched-mode supply as given in equation 1 and the voltage across the transformer, leads to the following expressions:

$$V_2 = K(V_1 + V_F) + \frac{(V_1 - V_{CEsat})}{N} - V_F \quad (5)$$

$$V_2 = K(V_1 + V_F) - V_F + \frac{(V_1 - V_{CEsat})}{N} \quad (6)$$

$$V_2 = V_{NORM} + \frac{(V_1 - V_{CEsat})}{N} \quad (7)$$

which provides an output voltage higher than that normally available in a switched-mode power supply. Thus, the second regulated DC output voltage $V_2$ may be increased as desired by switching NPN transistor 74 to a conductive state as required.

TRANSISTOR 74 IS OFF

With transistor 74 nonconductive, the current across the N2 winding of secondary 48 of inverter transformer 44 alternately passing through windings 70 and 72 is transmitted via diode 75 to the output line of the second regulated DC output voltage $V_2$. With current alternately transmitted by diodes 71 and 72 and further passing through diode 75, the voltage across the second transformer is now given by the following expressions:

$$V_{ACROSS\ WINDINGS\ 70\ AND\ 72} = V_2 + 2V_F - (V_1 + V_F) \quad (8)$$
$$= V_2 - V_1 + V_F \quad (9)$$

$$V_{ACROSS\ WINDINGS\ 50\ AND\ 54} = \frac{V_2 - V_1 + V_F}{N} \quad (10)$$

The second regulated DC output voltage $V_2$ may then be expressed in terms of the normal output voltage of a switched-mode power supply and the voltage across the second transformer of the present invention as:

$$V_2 = K(V_1 + V_F) - \frac{(V_2 - V_1 + V_F)}{N} - V_F \quad (11)$$

$$V_2 = K(V_1 + V_F) - V_F - \frac{(V_2 - V_1 + V_F)}{N} \quad (12)$$

$$V_2 = V_{NORM} - \frac{(V_2 - V_1 + V_F)}{N} \quad (13)$$

$$V_2 + \frac{V_2}{N} = V_{NORM} + \frac{(V_1 - V_F)}{N} \quad (14)$$

$$V_2 \frac{(N+1)}{N} = V_{NORM} + \frac{(V_1 - V_F)}{N} \quad (15)$$

$$V_2 = V_{NORM} \frac{(N)}{N+1} + \frac{(V_1 - V_F)}{N+1} \quad (16)$$

$$V_2 = V_{NORM} \left( \frac{N}{N+1} + \frac{(V_1 - V_F)}{(V_{NORM}(N+1))} \right) \quad (17)$$

$$V_2 = V_{NORM} \left( \frac{N + \frac{(V_1 - V_F)}{V_{NORM}}}{N+1} \right) \quad (18)$$

Therefore, if $V_1$ is $< V_{NORM}$, the second regulated DC output voltage $V_2$ is lower than that normally provided by a switched-mode power supply. By varying the time that the switching transistor 74 is on and off the second DC output voltage $V_2$ may be precisely regulated.

Figure 3:
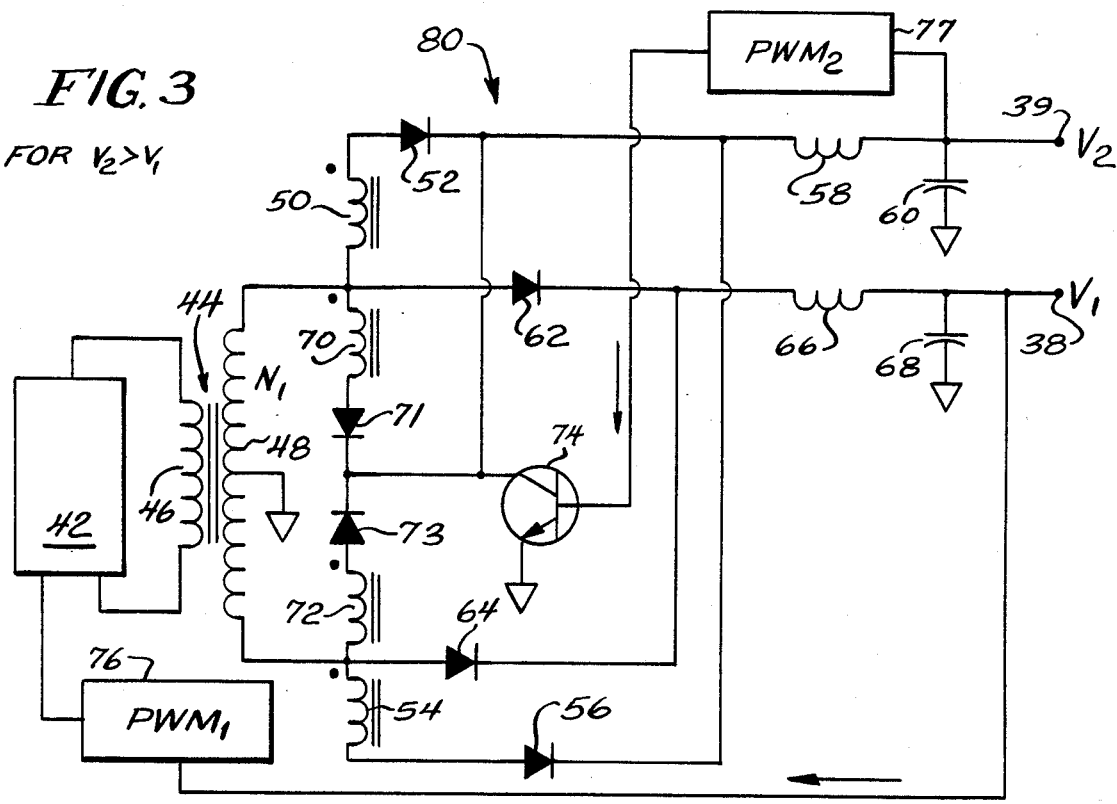
FIG. 3 shows in combined schematic and block diagram form another embodiment of a switched-mode power supply in accordance with the present invention for the case $V_2 > V_1$.
Figure 4:
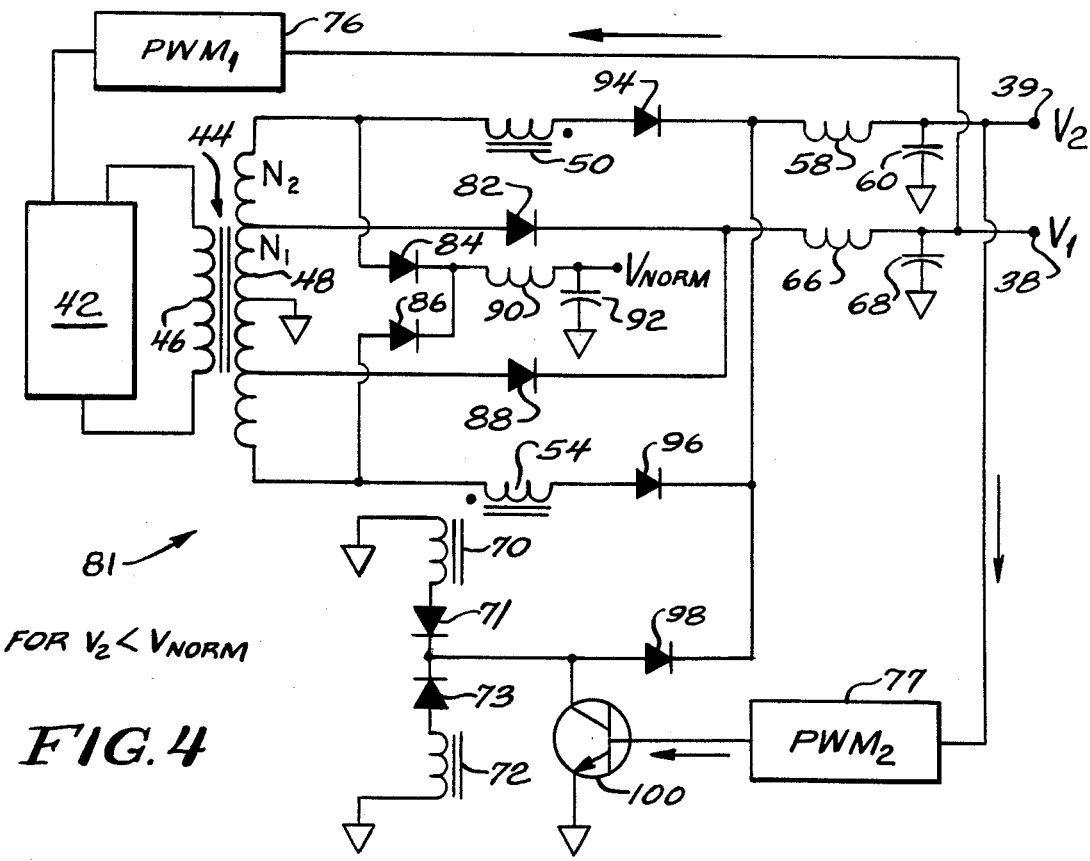
FIG. 4 shows in oombined schematic and block diagram form yet another embodiment of a switched-mode power supply in accordance with the present invention where $V_2 > V_{NORM}$.
Figure 5:
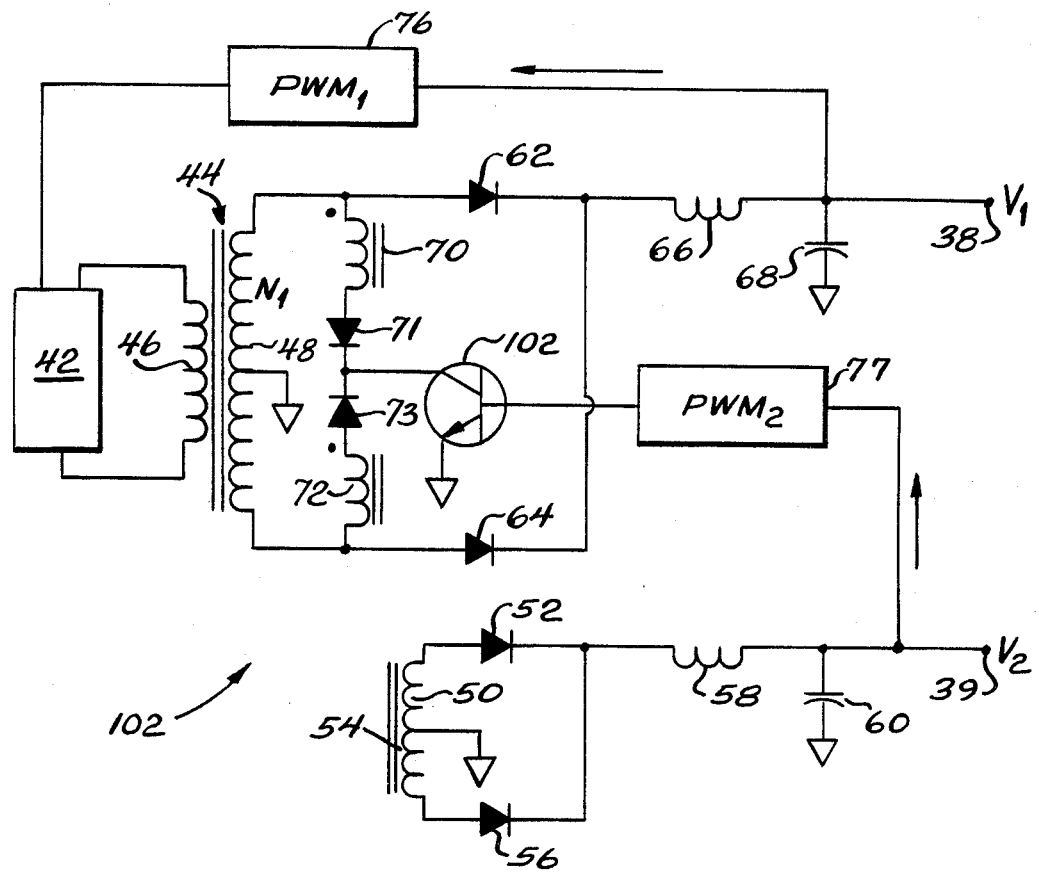
FIG. 5 shows in combined schematic and block diagram form still another embodiment of a switched-mode power supply in accordance with the present invention where the $V_1$ and $V_2$ output voltages are isolated.

Referring to FIGS. 3, 4 and 5, there are shown various alternative embodiments of the present invention. In these figures, those elements corresponding to similar elements performing identical functions to those described with respect to FIG. 2 have been assigned the same identification numbers as in FIG. 2. Having been previously discussed in detail with respect to FIG. 2, these common components will not be discussed in terms of the embodiments of FIGS. 3, 4 and 5. For the most part, only those components which give rise to a new configuration or perform a different function than described and shown in FIG. 2 are discussed in the following paragraphs.

Referring specifically to FIG. 3, there is shown another embodiment of the present invention in which the secondary winding 48 of the inverter transformer 44 is comprised of a single winding N1 and thus has a single output, i.e., the $V_1$ DC output voltage. A second transformer, which includes windings 50, 54, 70 and 72, is coupled to the single output secondary winding 48. The $V_2$ DC output voltage is derived from windings 50 and 54 of the second transformer which are coupled between respective ends of the secondary winding 48 of the inverter transformer 44 and the $V_2$ output terminal 39. The arrangement of FIG. 3 thus permits more than one regulated DC output voltage to be derived from an inverter transformer having a single output. For the case shown in FIG. 3, $V_2$ is greater than $V_1$. Thus, the approach shown in FIG. 3 provides for an additional DC voltage output greater than the output derived directly from the inverter transformer 44 without adding an additional winding to or redesigning the inverter transformer 44. The prior art requirement for the N2 secondary winding of the inverter transformer shown in FIG. 1 is thus eliminated by the switched-mode power supply arrangement of FIG. 3.

Referring to FIG. 4, there is shown a switched-mode power supply 81 in accordance with yet another embodiment of the present invention. In the power supply shown in FIG. 4, diodes 82 and 88 are coupled across a first winding N1 of the secondary winding 48 of the inverter transformer 44 to provide a rectified DC output therefrom to the $V_1$ output terminal 38. A second DC output voltage, $V_2$, is provided by coupling across windings 50 and 54 of a second transformer in circuit with the inverter transformer 44. A pair of rectifying diodes 94, 96 respectively couple windings 50, 54 of the second transformer to the $V_2$ output terminal 39. A pair of rectifying diodes 84, 86 are respectively coupled to windings 50 and 54 of the second transformer for providing a third regulated DC output voltage, $V_{NORM}$. The $V_{NORM}$ DC output voltage is filtered by the combination of inductor 90 and grounded capacitor 92.

In the power supply of FIG. 4, windings 70, 72 of the second transformer are not in circuit with either the other windings of the second transformer or the inverter transformer 44. However, windings 70 and 72 are electromagnetically coupled to windings 50 and 54 and to neutral ground potential. The $V_2$ output voltage is regulated by the switching operation of NPN transistor 100 to which a control input is provided by the second pulse width modulator 77. The collector of NPN transistor 100 is coupled to windings 70 and 72 as well as to the $V_2$ output terminal 39 via diode 98. The switching operation of NPN transistor 100 selectively diverts the output of windings 70 and 72 to neutral ground potential in regulating the $V_2$ DC output voltage. Because windings 70 and 72 are coupled to neutral ground potential, $V_2 < V_{NORM}$. The arrangement of FIG. 4, thus provides for a third regulated DC output voltage from the inverter transformer 44 without adding an additional winding to or redesigning either the inverter transformer 44 or the second transformer coupled to the output thereof.

Referring to FIG. 5, there is shown yet another embodiment of a switched-mode power supply 102 in accordance with the present invention. In the power supply of FIG. 5, windings 50 and 54 are not in circuit with windings 70 and 72, but rather are electromagnetioally coupled to these windings. In a preferred embodiment, windings 70, 72, 50 and 54 are included in a second transformer. Therefore, windings 50 and 54 are electrically isolated from windings 70 and 72 in a configuration in which the $V_2$ DC output voltage is similarly isolated from the $V_1$ output voltage. The arrangement of FIG. 5 is particularly adapted for high voltage applications wherein $V_2$ may be much greater than $V_1$ and it is necessary to isolate the high voltage DC output from the lower voltage DC output. This requirement may arise from safety considerations such as encountered in a conventional television receiver wherein high and low voltages are generated and safety considerations dictate that a viewer be isolated from the high voltage source. In the switched-mode power supply 102 of FIG. 5, a feedback path is provided from the $V_2$ output line via a second pulse width modulator 77 to NPN transistor 102 for controlling the current through windings 70 and 72. With windings 50 and 54 electromagnetically coupled to windings 70 and 72, the $V_2$ DC output voltage is thus regulated by means of this feedback arrangement. Windings 50 and 54 are further coupled to neutral ground potential.

There has thus been shown an improved switched-mode power supply with an output post-regulator for providing a plurality of well-regulated DC output voltages. By changing the connection of a second transformer coupled to the output of an inverter transformer, the regulator comprised primarily of the second pulse width modulator 77 and switching transistor 74 is capable of substantially increasing $V_2$ when the switching transistor 74 is conducting, while lowering $V_2$ very little when transistor 74 is off. On the other hand, another voltage regulator arrangement is capable of increasing $V_2$ very little when transistor 74 is conducting, while substantially lowering it when transistor 74 is off. This permits the use of a large turns ratio N in the second transformer which allows for the use of smaller diodes and transistors in the regulation circuit of the present invention since the current carried by these semiconductors equals the output current divided by the turns ratio N. This feature, plus the ability to control the on/off states of transistor 74 in the switched mode, makes the switched-mode power supply of the present invention an extremely efficient DC power supply.

While particular embodiments of the present invention have been shown and described, it will be obvious to those skilled in the art that changes and modifications may be made without departing from the invention in its broader aspects. For example, while the switching device which is responsive to a first output voltage for controlling a second output voltage is shown herein as an NPN transistor, various other elements well-known to those skilled in the appropriate arts could as easily be utilized in the present invention. For example, a metal-oxide-semiconductor field-effect transistor (MOSFET) could be used as the switching element in the present invention. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A switched-mode power supply for converting an input DC voltage into a plurality of regulated DC output voltages on respective output lines, said power supply comprising
   an inverter stage for converting said input DC voltage to an alternating voltage;
   first transformer/rectifying means coupled to said inverter stage for converting said alternating voltage to at least one of said plurality of regulated DC output voltages on a first one of said output lines;
   first feedback loop means coupled between said first output line and said inverter stage for regulating said at least one of said plurality of regulated DC output voltages;
   second transformer means coupled to said first output line and responsive to a portion of the current therein;
   second feedback means coupled to a second output line for providing a feedback signal corresponding to a second DC output voltage;
   switch means coupled to said second transformer means, to one of said first and second output lines, and to said second feedback means and responsive to said feedback signal, wherein said switch means is rendered conductive by said feedback signal for increasing the second DC output voltage; and
   conducting means coupled to said second transformer means, to said switch means, and to said second output line for reducing the second DC output voltage when said switch means is nonconductive in the absence of said feedback signal provided thereto and for providing current flowing in said second transformer means to said second output line in increasing the efficiency of said power supply.

2. A power supply as in claim 1 wherein said first feedback loop means includes a pulse width modulator for regulating said first DC output voltage.

3. A power supply as in claim 1 wherein said second feedback loop means includes a pulse width modulator for regulating said second DC output voltage.

4. A power supply as in claim 1 wherein said switch means includes transistor means for increasing the the second DC output voltage when conductive and said conducting means includes unidirectional conducting means for decreasing the second DC output voltage when said transistor means is nonconductive.

5. A power supply as in claim 4 wherein said unidirectional conducting means comprises a diode having an anode and a cathode.

6. A power supply as in claim 5 wherein the anode of said diode is coupled to said transistor means and to said second transformer means and the cathode of said diode is coupled to said second output line, wherein said diode is rendered conductive when said transistor means is nonconductive in the absence of said feedback signal provided thereto for reducing the second DC output voltage in providing regulation therefor and for providing current in said second transformer to said second output line for increased power supply efficiency.

7. A power supply as in claim 4 wherein said transistor means includes an NPN transistor with its base coupled to said second feedback loop means, its collector coupled to said second transformer means, and its emitter coupled to neutral ground potential for grounding a portion of the current through said second transformer means when said NPN transistor is conductive in increasing the second DC output voltage.

8. A power supply as in claim 1 wherein said second transformer means includes a first winding coupled to said first output line and a second winding coupled to said second output line.

9. A power supply as in claim 8 wherein the second winding of said second transformer means includes a larger number of turns than the first winding thereof.

10. A power supply as in claim 8 wherein the first winding of said second transformer means includes a larger number of turns than the second winding thereof.

11. A power supply as in claim 10 wherein the increase in the second DC output voltage with said switch means conducting and the decrease in the second DC output voltage with said switch means nonconducting is determined by the turns ratio of the first and second windings of said second transformer means.

12. A power supply as in claim 1 further including first and second filter means respectively coupled to said first and second output lines for filtering said first and second DC output voltages.

13. A power supply as in claim 1 wherein said first transformer means includes a secondary winding coupled to the first and second output lines and wherein the relative values of the first and second DC output voltages is determined by the turns ratio of said secondary winding.

14. A power supply as in claim 1 wherein said first transformer/rectifying means has a single DC output voltage and said second transformer means includes a plurality of windings each coupled to a respective output line for providing a regulated DC output voltage thereto.

15. A power supply as in claim 14 wherein said first transformer/rectifying means includes a single secondary winding from which said single DC output voltage is derived.

16. A power supply as in claim 14 wherein said second transformer means includes first and second windings coupled to said first output line for providing a first regulated DC output voltage thereto and third and fourth windings coupled to said second output line for providing said second DC output voltage thereto, wherein said second DC output voltage is greater than said first DC output voltage.

17. A power supply as in claim 1 further including a third output line coupled to said first transformer/rectifying means for providing a third regulated DC output voltage.

18. A power supply as in claim 17 wherein said third regulated DC output voltage is greater than said second regulated DC output voltage.

19. A power supply as in claim 17 further including filter means coupled to said third output line for filtering said third DC output voltage.

20. A power supply as in claim 18 wherein said first transformer/rectifying means is coupled to said first and second output lines and wherein said second transformer means includes a first pair of windings coupled to said second output line and a second pair of windings electromagnetically coupled to said first pair of windings and further coupled to said switch means, to said second output line, and to neutral ground potential, whereby said second DC output voltage is less than said third DC output voltage.

* * * * *